June 8, 1965
R. D. LUTJENS ETAL
3,188,055
MIXING DEVICE
Filed Oct. 11, 1963
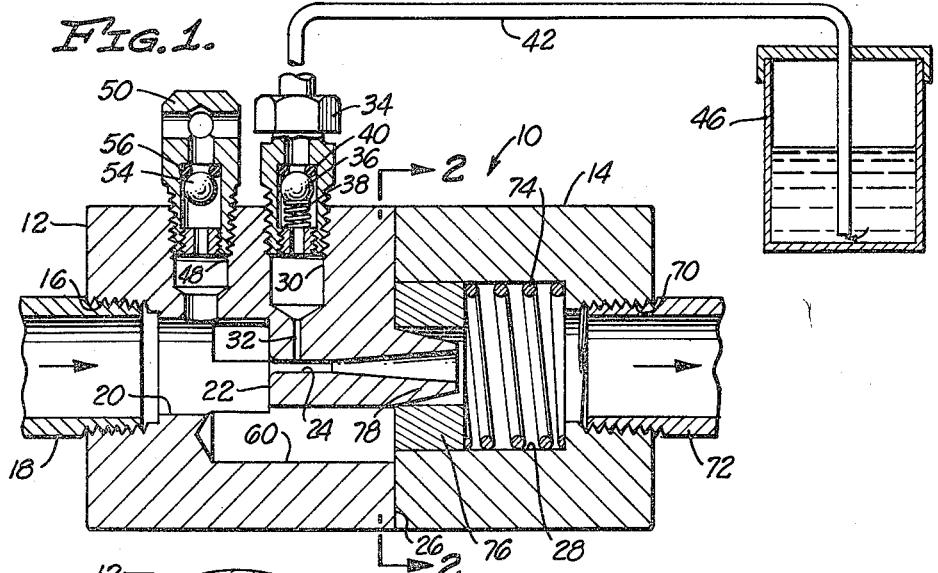
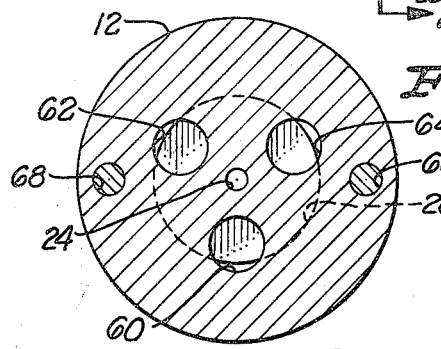
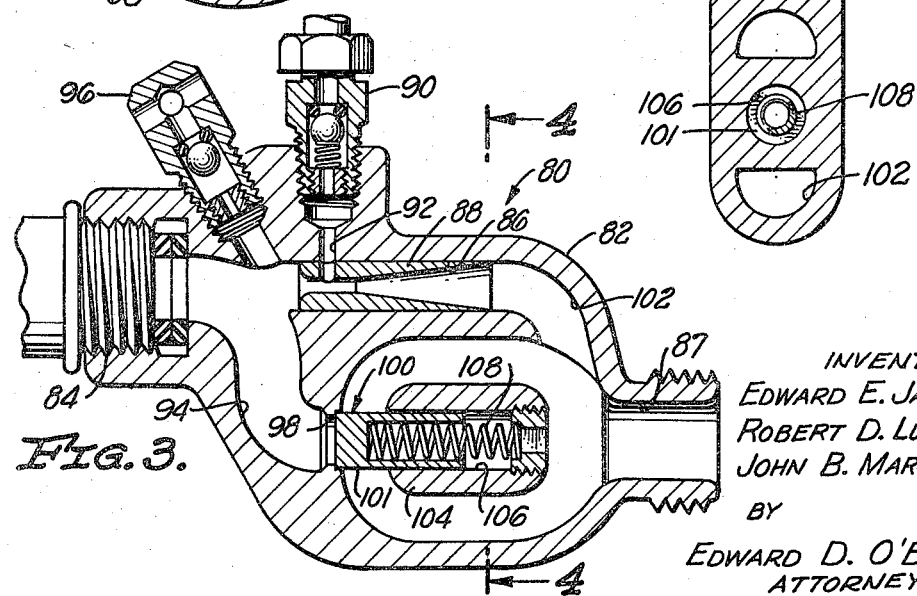
INVENTORS
EDWARD E. JACOBS,
ROBERT D. LUTJENS,
JOHN B. MARSHALL
BY
EDWARD D. O'BRIAN
ATTORNEY

United States Patent Office 3,188,055
Patented June 8, 1965

3,188,055
MIXING DEVICE
Robert D. Lutjens, Edward E. Jacobs, and John B. Marshall, Hacienda Heights, Calif., assignors to R. D. Lutjens & Co., Hacienda Heights, Calif.
Filed Oct. 11, 1963, Ser. No. 315,580
5 Claims. (Cl. 259—4)

This invention is directed to a fertilizer mixing device.

In the modern day world where everyone demands efficiency and convenience in every routine operation, great strides are being made for the benefit of the home owner. One area in which developments have not been keeping up with the progress in the remainder of the industry devoted to conveniences for householders is in delivery of fertilizer to growing things. The householder is still required to empty bags of granular material and spread it by hand, by shovel or by an inconvenient dispenser which is driven across the lawn. While such may be nearly adequate for lawn purposes, they are completely unsuitable for flower beds and gardens and other places where plants grow more tall than mere grass. It is desirable to feed the fertilizer to growing things during the performance of another operation and it is preferable to ease the householder's difficulty of handling granular fertilizing material.

Accordingly it is an object of this invention to provide a mixer for the mixing of liquid fertilizer with water so that the mixture may be applied to growing things during the watering operation.

It is another object of this invention to provide a fertilizer mixer which delivers an accurate amount of fertilizer to water passing through the mixer.

It is another object of this invention to provide a fertilizer mixer for mixing liquid fertilizer with water of such a nature that it provides a constant flow of liquid fertilizer into the mixer.

It is a further object of this invention to provide a fertilizer mixer which supplies liquid fertilizer to water flowing under pressure without the use of pumps or other moving parts in contact with the liquid fertilizer.

It is another object of this invention to provide a fertilizer mixing device of trouble free design to provide a long life of economic usage.

Other objects and advantages of this invention will become apparent upon a study of the following specification and the attached drawings in which;

FIG. 1 is a side elevational section through the preferred embodiment of the fertilizer mixer device of this invention;

FIG. 2 is a section taken along the line 2—2 of FIG. 1;

FIG. 3 is a side elevational section of another embodiment of the fertilizer mixing device of this invention; and FIG. 4 is a section taken along the line 4—4 of FIG. 3.

It can be stated in essentially summary form that this invention is directed to a fertilizer mixing device which takes advantage of the law of conservation of energy incumbent within a venturi device to cause a reduction in pressure below atmospheric pressure in high velocity water, and to cause this reduction in pressure to withdraw liquid fertilizer from a suitable adjacent vessel. In order to maintain the flow of fertilizer at a constant rate, means is built into the fertilizer mixing device to maintain a substantially constant pressure across the venturi to thus control the flow therethrough which, as is mentioned above, controls the pressure at the throat of the venturi. Anti-syphon means is also provided on the fertilizer mixing device of this invention to prevent the syphoning of fertilizer, and fertilizer mixed with water back into the water inlet supply line, should pressure therein fail. A more detailed understanding of this invention will be had upon a study of the following portion of the specification wherein the drawings are described in detail.

Referring now to FIG. 1, the fertilizer mixing device as seen therein generally indicated at 10. The device 10 primarily comprises first and second body members 12 and 14 which are formed in the proper manner to accomplish the desired results of this invention. Body member 12 has an inlet port 16 therein into which is secured a suitable inlet line 18. Inlet line 18 is connected to a suitable supply of inlet water under pressure, such as a city water line or an irrigation pressure pipe. Inlet line 18 is normally furnished with a conventional variety of flow control and shutoff devices such as a valve for the control of the flow of water therethrough. Coaxial with the inlet port 16 is cylindrical bore 20 within the body 12. The bore 20 terminates in a face 22 in which is located the inlet end of venturi 24. The venturi 24 as used in the fertilizing mixing device of this invention is a convergent-divergent nozzle type which is particularly designed to increase the velocity of water therethrough, as contrasted to the rate velocity within the bore 20, to thus decrease the pressure in the high velocity water in accordance with the law of conservation with energy. Body 12 generally terminates in face 26, but the divergent portion of the venturi 24 extends in a boss therebeyond to extend into the cylindrical bore 28.

Fertilizer inlet port 30 is located in the first body member 12 and is connected to and through the venturi 24 by means of a small hole 32 which is of proper diameter and length to control the flow of liquid fertilizer at the correct rate therethrough. Thus hole 32 acts as a metering hole as is hereinafter described. Fitting 34 is secured within the inlet port 30. Built within the fitting 34 s a check valve comprising ball 36, spring 38 and seat 40 which co-act together to permit flow only in the direction towards the fertilizer mixing device 10. Tube 42 is connected to the fitting 34 and terminates adjacent the bottom of liquid fertilizer vessel 46.

Port 48 is located in the side of first body member 12 and is directly connected by a large connecting hole to the cylindrical bore 20. Mounted within the port 48 is a check valve 50 which contains ball 54 and seat 56 which co-act together to permit flow only in the direction towards the fertilizer mixing device 10. The purpose of check valve 50 is to prevent flow of water, mixed liquid fertilizer and water, or liquid fertilizer back into the inlet line 18, should pressure fail therein and a vacuum be caused. In order to accomplish this result, check valve 50 is set in such a manner that it opens before the check valve in fitting 34, upon the reduction in pressure within the inlet line 18 below atmospheric pressure. When such occurs, air is drawn through check valve 50, and fertilizer is not withdrawn from the vessel 46.

As is seen in FIG. 2, the first body member 12 has three drilled passages 60, 62 and 64 entering from the face 26 and opening into the cylindrical bore 20. As seen in FIGS. 1 and 2, passage 60 is below the center line of bore 20, and passages 62 and 64 are disposed at approximately 120° with respect thereto and pass along the sides of port 30 and 48 without intersecting therewith. Thus passages 60, 62 and 64 open the inlet as defined by the cylindrical bore 20 to the face 26.

The second body member 14 is secured to the first body member 12 in a face to face relationship at the face 26 by means of conventional fastening means such as screws passing through second body member 14 into threaded holes 66 and 68 within the body member 12. Second body member 14 is ported with outlet port 70 which is coaxial with the cylindrical bore 28. Outlet line 72 is secured in the outlet port 70 for delivery of the fertilizer-water mixture to the point of use. Outlet line 70 may be a conventional garden hose, or may be a permanently installed line as in permanent watering installations, or may be a demountable, portable line as in some irrigation installations. Cylindrical bore 28 serves as a spring pocket which carries spring 74, which in turn engages with valve disc 76. As can be seen from FIG. 1, valve disc 76 is in the form of a hollow cylinder which fits within the bore 28 and around the protuberant end 78 containing a portion of venturi 24. In this position disc 76 rests against face 26 in such a position as to close the passages 60, 62 and 64. As can be seen from the above description, the fertilizer mixing device of this embodiment is primarily coaxial, and is eminently suitable for inexpensive manufacture on mass production equipment.

Referring now to FIGS. 3 and 4, another embodiment of the fertilizer mixing device of this invention is seen. Such a device is generally indicated at 80 and comprises a body 82 of somewhat different configuration than the body shown in FIG. 1. The body 82 is of such configuration as to particularly permit it to be cast by die casting or sand casting methods. As seen therein, the body 12 has an inlet port 84, similar to the inlet port 16, which can be connected in the manner described with respect to the device of FIG. 1. Similarly outlet 87 is of suitable configuration to be connected to a utilization line for the utilization of the fertilizer and water mixture. Body 82 contains bore 86 which is coaxial with the inlet port 84 and has venturi 88 located therein. Venturi 88 is of convergent-divergent design and has fertilizer inlet fitting 90 in communication with the throat thereof by means of metering passage 92. Similarly to the fitting 34, the fitting 90 contains a suitable check valve and is connected to a vessel containing liquid fertilizer. As is seen in FIG. 3, inlet passage 94 is connected to supply water under pressure to the convergent end of the venturi 88. Also connected into passage 94 is anti-syphon check valve 96 of similar construction to the check valve 50. Passage 94 is also directed to communicate with, and terminate at seat 98 of constant pressure drop valve 100. The interior of body 82 also defines outlet passage 102 which is in communication with the divergent portion of venturi 88, with the outlet bore 86 and with the outlet side of constant pressure drop valve 100.

Within bore 102 is located boss 104 which contains guide 106 which guides and carries constant pressure drop valve disc 101. Spring 108 urges the valve disc 101 to left to engage with seat 98 to thus close communication between passages 94 and 102, except through the venturi 88.

In operation, both the embodiments of FIGS. 1 and 3 are identical, so operation will be described with respect to the preferred embodiment of FIG. 1. The fertilizer mixing device 10 is connected to suitable inlet line 18 supplying water under pressure. This water is controlled by a suitable valve, and is of adequate quality for use for irrigational watering. Liquid fertilizer of suitable characteristics is furnished in vessel 46, and tube 42 is located adjacent to bottom thereof. Outlet line 72 is directed to the point where fertilizer is desired, and such direction may be manually caused by the manual watering through the actuation of a hose, through lawn sprinklers, or through suitable irrigation channels or sprayers. Thereupon the inlet water is turned into line 18 and flow passes toward outlet line 72. Flow through venturi 24 causes an increase in velociy of the water, together with the associated pressure drop which draws liquid fertilizer from vessel 46, through line 42 and fitting 34 and through the metering line 32 so that it enters the venturi 24 with the water and is mixed therewith. Should the pressure drop across the ends of the venturi 24 exceed a predetermined value, the valve disc 76 will move to the right to thus partially uncover passages 60, 62 and 64. Thus the pressure drop across the venturi 24 is controlled so that it cannot exceed a maximum value. In ordinary water supply systems the disc 76 partially opens the passages 60, 62 and 64 at all times so that the pressure across the venturi is maintained substantially constant. Of course, this constancy reflects upon the flow through the venturi 24 to thus control the pressure at the throat thereof. This pressure in turn controls the flow of liquid fertilizer through the metering hole 32. As a result of this a constant amount of fertilizer per unit time is delivered through watering passage 32 and out of the outlet line 72. Accordingly, control of the application of fertilizer is assured. As mentioned above, the embodiment of FIG. 3 operates in the same manner, as is evident from the above description of the parts thereof.

Check valve 50 prevents flow of water and/or fertilizer back into inlet line 18 by permitting air to flow into the body when pressure therein drops below atmospheric pressure. The check valve in fitting 34 prevents the flow of water into vessel 46 should there be an obstruction in outlet line 72 when there is pressure in the device. Furthermore, the check valve in fitting 34 has a stronger spring so check valve 50 opens first upon occurrence of subatmospheric pressure to prevent fertilizer flow in such circumstances.

This invention having been described in its preferred embodiment, it is apparent to those skilled in the art that many modifications and changes are possible therein without the exercise of inventive faculty. Accordingly the scope of this invention is defined by the scope of the appended claims.

What we claim as our invention is:

1. A mixing device, said mixing device having a body, said body having a water inlet, a fluid inlet and an outlet;
    a venturi positioned within said body, said venturi having a convergent end and a divergent end with a throat therebetween, said venturi throat being connected to said fluid inlet in said body, said convergent end being arranged in communication with said water inlet and said divergent end being in communication with said outlet from said body;
    a substantially constant pressure drop valve in said body connected in parallel to said venturi so that the pressure drop across said venturi from said convergent end to said divergent end is substantially independent of water flow through said device, said substantially constant pressure drop valve having a valve disc in association with a valve seat, said valve disc being spring urged toward said seat in a direction to close communication therethrough, said valve disc being urged in the direction against said spring urge by water under pressure in communication with said convergent end of said venturi and said disc being urged against said seat by water under pressure in communication with said divergent end of said venturi.

2. A fertilizer mixing device, said fertilizer mixing device having first and second body members;
    said first body member being adapted to be connected to means to supply water under pressure, said first body member being adapted to be connected to a supply of liquid fertilizer, a bore within said first body member, said bore being in communication with said water inlet supply means;
    a venturi within said first body member, said venturi having a convergent section, a throat and a divergent section, said convergent section being in communiaction with said bore, a hole connecting said venturi throat with said supply of liquid fertilizer;
    at least one passage in communication with said bore and directed substantially parallel to said venturi;
    a second body member adjacent said first body member, said second body member being secured to said first body member and being connectable to means to distribute mixed fertilizer and water, said divergent section of said venturi extending into said second body member;

a valve disc in said second body member, said valve disc being in the form of a hollow cylinder and positioned around said divergent section of said venturi, said valve disc being positionable to close said passage, spring means engaging said valve disc and urging said valve disc to close said passage, said divergent end of said venturi being in communication with said outlet through the interior of said valve disc.

3. The structure of claim 1 wherein a check valve is connected to be in communication with said convergent end of said venturi and with the exterior of said body, said check valve being connected so that upon the reduction in pressure below atmospheric pressure at said convergent end of said venturi fluid is drawn through said check valve into said body.

4. The structure of claim 2 wherein said first body has an extension within said second body member to house said divergent portion of said venturi, and said extension serves to meter liquid flow past said valve disc.

5. The structure of claim 4 wherein check valve means is in communication between the exterior of said body and said convergent end of said venturi, said check valve permitting entry of fluid within said body when pressure within said body decreases below atmospheric pressure.

References Cited by the Examiner

UNITED STATES PATENTS 2,969,748  1/61  Staats et al. _____ 137—599

FOREIGN PATENTS 1,206,860  8/59  France.

CHARLES A. WILLMUTH, *Primary Examiner.*